May 17, 1966 M. F. GAUDETTE ETAL 3,251,981

ELECTRONIC COUNTER COINCIDENCE CIRCUIT

Filed Nov. 29, 1962 2 Sheets-Sheet 1

INVENTORS
MARVIN F. GAUDETTE
EUGENE J. HENLEBEN
BY R. C. Terry
ATTORNEY

ELECTRONIC COUNTER COINCIDENCE CIRCUIT

Filed Nov. 29, 1962

2 Sheets-Sheet 2

INVENTORS
MARVIN F. GAUDETTE
EUGENE J. HENLEBEN

BY R. C. Terry
ATTORNEY

United States Patent Office 3,251,981

Patented May 17, 1966

3,251,981

ELECTRONIC COUNTER COINCIDENCE CIRCUIT

Marvin F. Gaudette, Chicago, and Eugene J. Henleben, Glenview, Ill., assignors to Teletype Corporation, Skokie, Ill., a corporation of Delaware Filed Nov. 29, 1962, Ser. No. 240,877
5 Claims. (Cl. 235—92)

Figure 1:
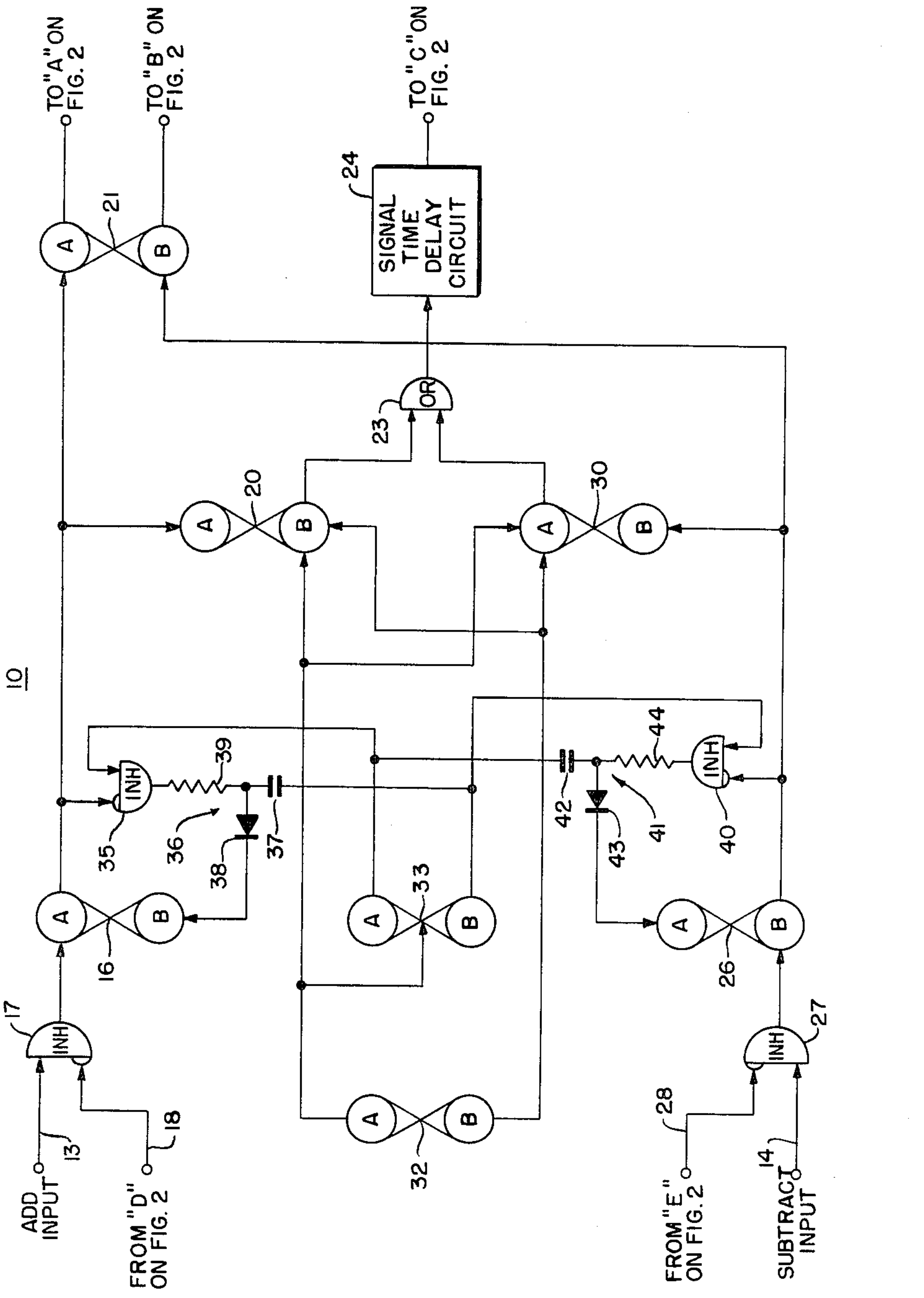

This invention relates to a coincidence circuit for controlling the transmission of input pulses to a counter and more specifically to a circuit for converting an electronic binary counter into a differential counter.

In many operations, such as those involved at a high speed teletypewriter switching center it is necessary to maintain a running record of the number of messages on hand for retransmission. This necessitates the provision of differential counting means for counting both incoming messages and outgoing messages and registering the difference between them as an indication of the number of stored messages awaiting transmission. Often in such operations, the counter must be capable of receiving pulses to be added and pulses to be subtracted at the same or substantially the same instant. When pulses to be added and pulses to be subtracted are simultaneously received there are two alternatives—the counter may operate to perform the two operations sequentially or the counter may operate to cancel out the effect of the two input pulses. Rather complex circuitry is required to perform the canceling operation, particularly where the pulses are not received at exactly the same time, whereas less complex circuitry may be utilized to cause the two operations to be performed sequentially.

An object of this invention is to provide a new and improved circuit for receiving input pulses to be added and subtracted at substantially the same time and for causing the input pulses to be sequentially transmitted to a counter.

Another object of this invention is to provide a new and improved circuit for receiving pulses to be added and subtracted at substantially the same time, for causing the pulses to be sequentially transmitted to a reversible counter, and for conditioning the counter for the respective adding and subtracting operations.

An additional object of this invention is to provide a new, improved, simple and economical coincidence circuit for controlling the transmission to a counter of input pulses received at substantially the same time.

With these and other objects in mind, the present invention comprises a coincidence circuit for receiving a plurality of input pulses to be counted which may be received at substantially the same time and for causing the pulses to be sequentially transmitted to a counter. A plurality of input conductors are provided over which the input pulses are transmitted, and a storage device is associated with each input conductor so that an input pulse transmitted over one of the input conductors is independently stored in the storage device associated therewith. Control circuitry is provided for sequentially reading out pulses stored in the storage devices associated therewith so that pulses received at substantially the same time over different input conductors are serially transmitted, with a distinct transition provided therebetween, to a counter.

Figure 2:
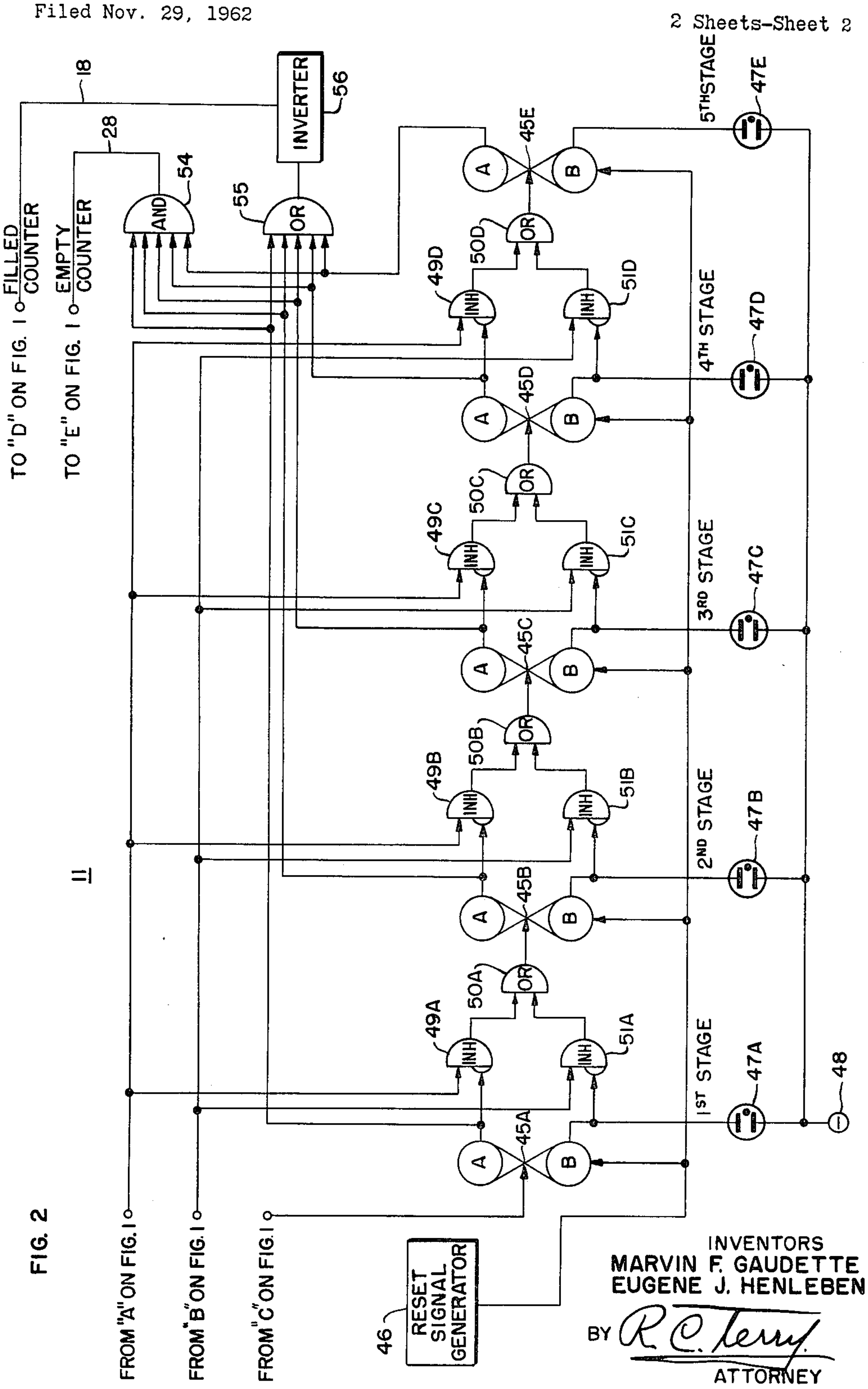

Other objects, advantages and features of the invention will become apparent by reference to the following detailed description and the drawings wherein:

FIG. 1 is a schematic diagram of a preferred embodiment of a coincidence circuit for controlling the transmission of input pulses to a counter, and FIG. 2 is a schematic diagram illustrating a preferred embodiment of a reversible binary counter.

A plurality of flip-flops, inhibit gates, "AND" gates and "OR" gates are utilized in a coincidence circuit illustrated in FIG. 1 and a counter circuit illustrated in FIG. 2. Since these circuit components are common in the art, they have been illustrated symbolically (as described below) rather than in detailed form.

The flip-flops have been illustrated as a pair of circles interconnected by a pair of lines crossed in an X configuration, each circle representing an active element of the flip-flop and its associated circuitry. An input to a control electrode of one of the active flip-flop elements is illustrated by a line connected directly to the left side, top or bottom of the circle representing the particular active element, and an input to control electrodes of both of the active flip-flop elements is illustrated by a line connected to the intersection of the interconnecting pair of lines crossed in an X configuration. An output from an active flip-flop element is illustrated by a line connected to the right side of the circle representing the particular active element.

The flip-flops are bistable devices and are so designed that, at any given time, one of the active elements is operative (conductive) and the other active element is nonoperative (nonconductive). When an active element is rendered operative, the potential at the output thereof rises in value (a transition in the positive direction); and when an active element is rendered nonoperative, the potential at the output thereof drops in value (a transition in the negative direction). If an input signal or pulse is applied to a control electrode of one of the active elements, the active element to which the pulse is applied is rendered nonoperative (nonconductive) and the other active element is rendered operative (conductive), provided the active elements are not already so conditioned. If an input signal or pulse is applied to the control electrode inputs of both active elements, the nonoperative active element is rendered operative and the operative active element is rendered nonoperative.

The "AND" gates are illustrated as half circles labeled with the word "AND," the inhibit gates are illustrated as half circles labeled with the letters "INH," and the "OR" gates are illustrated as half circles labeled with the word "OR."

*Concidence circuit*

Referring to FIG. 1, a coincidence circuit 10 is illustrated which operates to control the transmission of input pulses to the reversible counter 11 illustrated in FIG. 2, so that a time interval is provided between the transmission to the counter 11 of input pulses applied to input conductors 13 and 14 at the same time or substantially the same time. In the specific embodiment illustrated, the input conductor 13 is provided for the transmission of input pulses to be added in the counter 11 and the input conductor 14 is provided for the transmission of input pulses to be subtracted in the counter 11.

Input pulses applied to the input conductor 13 are transmitted to the control electrode of active element A of a storage flip-flop 16 through an inhibit gate 17. An input pulse is permitted to pass through the inhibit gate 17 only when a signal indicative of a filled counter is not applied to the inhibit gate 17 through a conductor 18, as will be described hereinafter. In response to the application thereto of an input pulse, active element A of the storage flip-flop 16 is rendered nonoperative so that the output thereof drops in potential and active element B of the storage flip-flop 16 is rendered operative. This is the set condition of the storage flip-flop 16 when an input pulse is stored therein. Subsequently, when a reset signal is applied to the control electrode of active element B of the storage flip-flop 16, active element B is rendered nonoperative and active element A is rendered operative so that the output thereof rises in potential and an output signal is provided thereby. This is the reset condition of the storage flip-flop 16 when a stored input pulse is read out therefrom.

The output signal of active element A of the storage flip-flop 16 is transmitted to active elements A of a pair of control flip-flops 20 and 21 so that active elements A of the control flip-flops 20 and 21 are rendered nonoperative and active elements B of the control flip-flops 20 and 21 are rendered operative. This is the set condition of the control flip-flop 20 and the add condition of the flip-flop 21. When active element B of the control flip-flop 21 is rendered operative, the output thereof rises in potential to apply a signal to the counter 11 which conditions the counter 11 for an adding operation, as described hereinafter, and when active element B of the control flip-flop 20 is rendered operative, the output thereof also rises in potential so that an input pulse is applied therefrom to the counter 11 through an "OR" gate 23 and a signal time delay circuit 24. The time period of the input pulse applied to the counter 11 is determined by the time interval which elapses before a reset signal is applied to active element B of the control flip-flop 20 to cause active element B of the flip-flop 20 to be rendered nonoperative so that the output thereof drops in potential. At the same time the active element A of the flip-flop 20 is rendered operative. This is the reset condition of the control flip-flop 20.

The signal time delay circuit 24 is provided to delay, for a predetermined period of time, the transmission of an input pulse to the counter 11 so that time is allowed for the counter 11 to be conditioned by the control flip-flop 21 for an adding operation or a subtracting operation.

Input pulses applied to the input conductor 14 are transmitted to the control electrode of active element B of a storage flip-flop 26 through an inhibit gate 27. An input pulse is permitted to pass through the inhibit gate 27 only when a signal indicative of an empty counter is not applied to the inhibit gate 27 through a conductor 28, as will be described hereinafter. In response to the application thereto of an input pulse, active element B of the storage flip-flop 26 is rendered nonoperative so that the output thereof drops in potential and active element A is rendered operative. This is the set condition of storage flip-flop 26 when an input pulse is stored therein. Subsequently, when a reset signal is applied to active element A of the storage flip-flop 26, active element A is rendered nonoperative and active element B is rendered operative so that the output thereof rises in potential and an output signal is provided thereby. This is the reset condition of storage flip-flop 26 when a stored input pulse is read out therefrom.

The output signal of active element B of the storage flip-flop 26 is transmitted to active elements B of the control flip-flops 21 and 30 so that active elements B of the control flip-flops 21 and 30 are rendered nonoperative and active elements A of the control flip-flops 21 and 30 are rendered operative. This is the set condition of control flip-flop 30 and the subtract condition of the flip-flop 21. When active element A of the control flip-flop 21 is rendered operative, the output thereof rises in potential to apply a signal to the counter 11 which conditions the counter 11 for a subtracting operation; and when active element A of the control flip-flop 30 is rendered operative, the output thereof rises in potential so that an input pulse is applied therefrom to the counter 11 through the "OR" gate 23 and the signal time delay circuit 24. The time period of the input pulse applied to the counter 11 is determined by the time interval which elapses before a reset signal is applied to active element A of the control flip-flop 30 to cause active element A of the flip-flop 30 to be rendered nonoperative so that the output thereof drops in potential. At the same time active element B of the flip-flop 30 is rendered operative. This is the reset condition of the flip-flop 30.

A free running multivibrator (flip-flop) 32 and a clock flip-flop 33 are provided for controlling the resetting of the storage flip-flops 16 and 26 and the control flip-flops 20 and 30. The free running multivibrator 32 is designed to operate as an oscillator, and thus, to continuously switch from one condition to the other condition so that active elements A and B are alternately rendered operative at preset time intervals, whereby output signals are alternately provided thereby. Active elements A and B of the clock flip-flop 33 are alternately rendered operative in response to output signals provided by active element A of the free running multivibrator 32 so that output signals are alternately provided by active elements A and B of the clock flip-flop 33. Thus, output signals are alternately provided by the clock flip-flop 33 at one-half the frequency at which output signals are alternately provided by the free running multivibrator 32.

The output of active element A of the clock flip-flop 33 and the output of active element A of the storage flip-flop 16 are connected to an inhibit gate 35, so that when an output signal is provided by active element A of the clock flip-flop 33 and active element A of the storage flip-flop 16 is nonoperative, an output signal is provided by the inhibit gate 35. The output of the inhibit gate 35 and the output of active element B of the clock flip-flop 33 are connected to a flip-flop priming and trigger circuit 36 so that, when output signals are provided thereby, a reset signal is applied to active element B of the storage flip-flop 16 which renders active element B nonoperative and active element A operative. As a result, the output of active element A of the flip-flop 16 is caused to rise in potential and an output signal is provided thereby.

The priming and trigger circuit 36 includes a capacitor 37 and a diode 38 connected in series between the output of active element B of the clock flip-flop 33 and the input to active element B of the storage flip-flop 16. The output of the inhibit gate 35 is applied to the junction of the capacitor 37 and the diode 38 through a resistor 39. When an output signal is provided by the inhibit gate 35, as discussed in the previous paragraph, a rise in potential is applied to the aforementioned junction to cause the capacitor 37 to become charged to the value of this potential, the potential at the junction of the capacitor 37 and the diode 38 being at a value which is almost sufficient to forward bias the diode 38 into conduction. In this manner the output of the inhibit gate 35 "primes" the flip-flop 16 for receipt of a reset pulse from the clock flip-flop 33.

When the active element B of the flip-flop 33 is rendered operative, the output therefrom rises causing the charge on the capacitor 37 to increase which, in turn, forward biases the diode 38 causing a reset pulse to be applied to the active element B of the flip-flop 16 if the flip-flop previously has been primed by the gate 35. It is to be noted that at the time active element B of the clock flip-flop 33 is rendered operative, active element A of that flip-flop is rendered nonoperative thereby removing the priming output signal of the inhibit gate 35. However, the value of the resistor 39 is chosen to cause the rate of discharge of the capacitor 37 to be such that the charge on the capacitor 37 is high enough at the time the reset pulse is applied from active element B of the flip-flop 33 to allow the reset pulse to be applied to the flip-flop 16.

When there is no output from the inhibit gate 35, the charge on the capacitor 37 is low causing the diode 38 to be reverse biased. If a reset pulse is then applied to the capacitor 37 from active element B of the flip-flop 33, the charge on the capacitor is increased but the increase is not sufficient to forward bias the diode 38 into conduction and the reset pulse is not applied to the active element B of the flip-flop 16. The inhibit gate 35 thus protects against the loss of an input pulse as a result of the simultaneous transmission of an input pulse to active element A of the storage flip-flop 16 and transmission of a reset signal to active element B of the storage flip-flop 16.

Thus, if the counter 11 is not filled, an input pulse transmitted over the input conductor 13 is transmitted to active element A of the storage flip-flop 16 and is stored therein until a reset signal is applied to active element B of the storage flip-flop 16.

The output signals of active elements A and B of the free running multivibrator 32 are applied to active element B of the control flip-flop 20 and cause active element B of the control flip-flop 20 to be rendered nonoperative if it was previously operative thus resetting the control flip-flop 20. The time period of the input pulse applied to the counter 11 from active element B of the control flip-flop 20 is determined by the time interval between the transmission of a signal from active element A of the storage flip-flop 16 to active element A of the control flip-flop 20 and the subsequent transmission of an output signal from either active element A or element B of the free running multivibrator 32 to active element B of the control flip-flop 20.

The output of active element B of the clock flip-flop 33 and the output of active element B of the storage flip-flop 26 are connected to an inhibit gate 40; so that when an output signal is provided by active element B of the clock flip-flop 33 and active element B of the storage flip-flop 26 is nonoperative, an output signal is provided by the inhibit gate 40. The output of the inhibit gate 40 and the output of active element A of the clock flip-flop 33 are connected to a flip-flop priming and trigger circuit 41; so that when output signals are provided thereby, a reset signal is applied to active element A of the storage flip-flop 26 which renders active element A nonoperative and active element B operative. As a result, the output of active element B is caused to rise in potential and an output signal is provided thereby. The inhibit gate 40 is provided for the same reason that inhibit gate 35 is provided, and the capacitor 42, diode 43 and resistor 44 perform the same functions as the capacitor 37, diode 38 and resistor 39 perform, as previously described.

Thus, if the counter 11 is not empty, an input pulse transmitter over the input conductor 14 is transmitted to active element B of the storage flip-flop 26 and is stored therein until a reset signal is applied to active element A of the storage flip-flop 26.

The output signals of active elements A and B of the free running multivibrator 32, are also applied to active element A of the control flip-flop 30 and the output signals cause active element A of the control flip-flop 30 to be rendered nonoperative if it was previously operative to reset the control flip-flop 30. Thus, the time period of the input pulse applied to the counter 11 from active element A of the control flip-flop 30 is determined by the time interval between the transmission of a signal from active element B of the storage flip-flop 26 to active element B of the control flip-flop 30 and the subsequent transmission of an output signal from either active element A or active element B of the free running multivibrator 32 to active element A of the control flip-flop 30.

Assuming input pulses are received at substantially the same time in the input conductors 13 and 14 and assuming the counter 11 is neither filled nor empty, as indicated by signals on the conductors 18 and 28, active element A of the storage flip-flop 16 and active element B of the storage flip-flop 26 are simultaneously rendered nonoperative so that the input pulses are simultaneously stored therein. If at this time active element A of the clock flip-flop 33 is operative, a signal is applied from the inhibit gate 35 to the priming and trigger circuit 26 to prime the circuit 36 for applying a reset pulse to active element B of the storage flip-flop 16. Since active element B of the clock flip-flop 33 is nonconductive, no signal is applied from the inhibit gate 40 to the circuit 41. As a result, the priming and trigger circuit 41 associated with the storage flip-flop 26 is not primed for applying a reset pulse to the storage flip-flop 26.

In response to the application of the next output signal of active element A of the free running multivibrator 32 to the clock flip-flop 33, active element A of the clock flip-flop 33 is rendered nonoperative and active element B thereof is rendered operative. When active element B of the clock flip-flop 33 is rendered operative, a reset signal is applied from the circuit 36 to active element B of the storage flip-flop 16, and a signal is supplied from active element B of the clock flip-flop 33 to the inhibit gate 40.

In response to the application thereto of the signal from the circuit 36, active element B of the storage flip-flop 16 is rendered nonoperative and active element A thereof is rendered operative so that a signal is transmitted to active element A of the control flip-flop 20 and to active element A of the control flip-flop 21. Active element A of the control flip-flop 20 is rendered nonoperative and active element B thereof is rendered operative, so that an input pulse is transmitted from active element B of the control flip-flop 20 through the "OR" gate 23 and the signal time delay circuit 24 to the counter 11. Active element A of the control flip-flop 21 is rendered nonoperative and active element B thereof is rendered operative, so that an input signal is transmitted from active element B to the counter 11 which conditions the counter for an adding operation.

In response to the application thereto of the signal from the clock flip-flop 33, a signal is supplied from the inhibit gate 40 to the priming and trigger circuit 41 to prime the circuit for applying a reset pulse to active element A of the storage flip-flop 26.

The next output signal from active element B of the free running multivibrator 32 applied to active element B of the control flip-flop 20 renders active element B of flip-flop 20 nonoperative, so that the output thereof drops in potential; and active element A of the control flip-flop 20 is rendered operative. Thus the flip-flop 20 is reset. When the output of active element B of the control flip-flop 20 drops in potential an input pulse is no longer transmitted to the counter 11 through the "OR" gate 23 and the signal time delay circuit 24. Thus the time period of the input pulse transmitted to the counter 11 is equal to the time period between succeeding output pulses provided by active elements A and B of the free running multivibrator 32 since an output signal from active element A initiates resetting of the storage flip-flop 16 and an output signal from active element B resets the control flip-flop 20.

In response to the application of the next output signal provided by active element A of the free running multivibrator 32 to the clock flip-flop 33, active element A of the clock flip-flop 33 is rendered operative and active element B thereof is rendered nonoperative. When active element A of the clock flip-flop 33 is rendered operative, a reset signal is transmitted from the circuit 41 to active element A of the storage flip-flop 26 since the circuit 41 previously has been primed; and a signal is transmitted from active element A of the clock flip-flop 33 to the inhibit gate 35.

In response to the application thereto of the reset signal from active element A of the clock flip-flop 33, active element A of the storage flip-flop 26 is rendered nonoperative and active element B thereof is rendered operative, so that a signal is transmitted to active element B of the control flip-flop 30 and to active element B of the control flip-flop 21. Active element B of the control flip-flop 21 is rendered nonoperative and active element A thereof is rendered operative, so that a signal is transmitted from active element A to the counter 11 which conditions the counter for a subtracting operation. Active element B of the control flip-flop 30 is rendered nonoperative and active element A thereof is rendered operative so that an input pulse is transmitted through the "OR" gate 23 and the signal time delay circuit 24 to the counter 11.

The application of the signal from active element A of the clock flip-flop 33 has no effect on the inhibit gate 35, unless a subsequent input signal has been applied to active element A of the storage flip-flop 16, since active element A of the storage flip-flop 16 is operative thereby preventing the inhibit gate 35 from applying a priming signal to the circuit 36.

In response to the application thereto of the next output signal from active element B of the free running multivibrator 32, active element A of the control flip-flop 30 is rendered non-operative so that the output thereof drops in potential and active element B of the control flip-flop 30 is rendered operative (reset condition of control flip-flop 30). When the output of active element A of the control flip-flop 30 drops in potential, an input pulse is no longer transmitted to the counter 11 through the "OR" gate 23 and the signal time delay circuit 24. Thus the time period of the input pulse to the counter 11 is equal to the time period between succeeding output pulses provided by active elements A and B of the free running multivibrator 32 since an output signal from active element A initiates resetting of the storage flip-flop 26 and an output signal from active element B resets the control flip-flop 30.

Thus, the pulse to be added and the pulse to be subtracted which were received at substantially the same time in the input conductors 13 and 14 are serially transmitted to the counter 11 with a predetermined time interval therebetween. The time interval between these input pulses to the counter 11 and the time interval of each input signal are equal to the time interval between the alternate operation of active element A and B of the free running multivibrator 32, since reset signals are applied to the control flip-flops 20 and 30 from the multivibrator 32 at twice the frequency at which reset signals are applied to the storage flip-flops 16 and 26 through the circuits 36 and 41 from the clock flip-flop 33.

In the above-described operation, the transmission of an input pulse to be added is initiated by an output signal from active element A of the free running multivibrator 32; the transmission of the input pulse to be added is stopped by the next succeeding output signal from active element B of the free running multivibrator 32; the transmission of an input pulse to be subtracted is initiated by the next succeeding output signal from active element A of the free running multivibrator 32; and the transmission of the input pulse to be subtracted is stopped by the next succeeding output signal from active element B of the free running multivibrator 32.

*Counter circuit*

Referring to FIG. 2, the counter circuit 11 is illustrated which is provided for receiving input pulses from the previously described coincidence circuit 10. In the illustrated embodiment, a binary electronic counter is utilized. However, the coincidence circuit 10 may be modified so that other types of counters may be utilized. The illustrated binary counter 11 includes five binary stages, each stage of which includes one of five counter flip-flops 45A to 45E.

Prior to the initiation of a counting operation, the counter circuit 11 may be reset for operation by initiating operation of a reset signal generator 46 which applies a reset signal to active element B of each of the counter flip-flops 45A to 45E. In response to the reset signal, active element B of each counter flip-flop is rendered nonoperative and active element A thereof is rendered operative.

The reset signal is of sufficient duration to prevent any of the counter flip-flops 45A to 45E from being responsive to output pulses from the next preceding stage during the reset interval. In effect the reset signal overrides all other signals caused by a change of state of any of the counter flip-flops and sets the counter to "zero." When an input signal or pulse is applied to the common input of a counter flip-flop 45A to 45E, the operative active element is rendered nonoperative and the nonoperative active element is rendered operative.

Indicator lamps 47A to 47E are associated with the counter flip-flops 45A to 45E, respectively, and are connected between the output of active element B of their associated counter flip-flops and a negative battery source 48. When active element B of a counter flip-flop is rendered operative, the indicator lamp associated therewith is caused to turn on to indicate a binary "1" condition and when active element B is rendered nonoperative, the associated indicator lamp turns off to indicate a binary "0" condition.

Inhibit gates 49A to 49D are associated with active elements A of the counter flip-flops 45A to 45D for permitting the passage of a signal from active element A of one of the counter flip-flops to the input of the next succeeding counter flip-flop through an associated "OR" gate 50A to 50D. Inhibit gates 51A to 51D are associated with active elements B of the counter flip-flops 45A to 45D for permitting the passage of a signal from active element B of one of the counter flip-flops to the input of the next succeeding counter flip-flop through the associated "OR" gates 50A to 50D.

For a signal to pass through an inhibit gate 49A to 49D, active element A of the associated counter flip-flop 45A to 45D must be rendered nonoperative and active element A of the control flip-flop 21 in the coincidence circuit 10 must be operative. For a signal to pass through an inhibit gate 51A to 51D, active element B of the associated counter flip-flop 45A to 45D must be rendered nonoperative and active element B of the control flip-flop 21 in the coincidence circuit 10 must be operative. The inhibit gates are responsive only to signal transitions.

As previously set forth in conjunction with the description of the operation of the coincidence circuit 10, active element A of the control flip-flop 21 is rendered operative when an input signal to be subtracted is applied to the coincidence circuit and active element B of the control flip-flop 21 is rendered operative when an input signal to be added is applied to the coincidence circuit.

Assuming that pulses to be added are transmitted to the counter circuit 11 from the coincidence circuit 10 and assuming the counter circuit 11 has been reset, inhibit gates 51A to 51D are conditioned for passing input signals from one counter flip-flop to the next succeeding counter flip-flop since active element B of the control flip-flop 21 is operative, as described hereinabove in conjunction with operation of the coincidence circuit 10. The first input pulse from the coincidence circuit is applied to the common input of the counter flip-flop 45A to cause active element A thereof to be rendered nonoperative and active element B thereof to be rendered operative. A signal is not passed through inhibit gate 49A since active element A of the control flip-flop 21 is nonoperative, and a signal is not passed through inhibit gate 51A since active element B of the counter flip-flop 45A is operative. Indicator lamp 47A is caused to turn on to indicate a binary "1" condition in the first stage of the counter 11 since active element B of the counter flip-flop 45A is operative.

In response to the application of the next succeeding input pulse to be added on the common input of the counter flip-flop 45A, active element A thereof is rendered operative and active element B thereof is rendered nonoperative so that a signal passes through the inhibit gate 51A and the "OR" gate 50A to the common input of the counter flip-flop 45B. Active element A of the counter flip-flop 45B is thus rendered nonoperative and active element B thereof is rendered operative. A signal is not passed through inhibit gates 49A and 49B since active element A of the control flip-flop 21 is nonoperative and a signal is not passed through inhibit gate 51B since active element B of the counter flip-flop 45B is operative. The indicator lamp 47A associated with the first stage of the counter 11 is thus caused to turn off to indicate a binary "0" condition in the first counter stage, since active element B of the counter flip-flop 45A is rendered nonoperative, and the indicator lamp 47B associated with the second stage of the counter 11 is caused to turn on to indicate a binary "1" condition in the second counter stage, since active element B of the counter flip-flop 45B is operative.

As subsequent pulses to be added are applied to the common input of the counter flip-flop 45A, the counter circuit 11 operates in a similar manner until active elements B of all the counter flip-flops 45A to 45E have been rendered conductive and all of the lamps 47A to 47E have been turned on, which is indicative of a filled counter.

Assuming input pulses to be subtracted now are transmitted to the counter circuit 11 and assuming the counter is filled (active element B of all of the counter flip-flops 45A to 45E operative and all of the indicator lamps 47A to 47E turned on), inhibit gates 49A to 49D are conditioned for passing input signals from the counter flip-flop to the next succeeding counter flip-flop since active element A of the control flip-flop 21 has been rendered operative, as described hereinabove in conjunction with operation of the coincidence circuit 10. The first input pulse from the coincidence circuit 10 is applied to the common input of the counter flip-flop 45A to cause active element B thereof to be rendered nonoperative and active element A thereof to be rendered operative. A signal is not passed through inhibit gate 49A since active element A of the counter flip-flop 45A is operative, and a signal will not be passed through inhibit gate 51A since it is not conditioned for conduction due to the fact that active element B of the control flip-flop 21 is nonoperative. The indicator lamp 47A associated with the first stage of the counter circuit 11 will be turned off to indicate a binary "0" in the first counter stage.

In response to the application of the next succeeding input pulse to the common input of the counter flip-flop 45A active element A thereof is rendered nonoperative and active element B thereof is rendered operative. A signal then will pass through the inhibit gate 49A and the "OR" gate 50A to the common input of the counter flip-flop 45B since active element A of the counter flip-flop 45A is nonoperative and active element A of the control flip-flop 21 is operative. Active element A of the counter flip-flop 45B will thus be rendered operative and active element B thereof will be rendered nonoperative. A signal will not pass through inhibit gate 49B since active element A of the counter flip-flop 45B is operative and a signal will not pass through the inhibit gates 51A and 51B since they are not conditioned for conduction due to the fact that active element B of the control flip-flop 21 is nonoperative. Thus, the indicator lamp 47B associated with the second stage of the counter 11 will be turned off to indicate a binary "0" condition in the second counter stage and indicator lamp 47A associated with the first stage of the counter 11 will be turned on to indicate a binary "1" condition in the first counter stage.

As subsequent input pulses to be subtracted are applied to the common input of the counter flip-flop 45A, the counter circuit 11 will operate in a similar manner until active elements B of all the counter flip-flops 45A to 45E are rendered nonoperative and all of the indicator lamps 47A to 47E are turned off, which is indicative of an empty counter.

The output of active elements A of all the counter flip-flops 45A to 45E are connected to an "AND" gate 54 and an "OR" gate 55. If active elements A of all the counter flip-flops 45A to 45E are operative (indicative of an empty counter) a signal is transmitted from the "AND" gate 54 over line 28 to the inhibit gate 27 of the coincidence circuit 10. In response to the signal from the "AND" gate 54, the inhibit gate 27 prevents transmission of input signals, to be subtracted, through the inhibit gate 27 to the storage flip-flop 26. If active element A of any one of the counter flip-flops 45A to 45E is nonoperative (indicative of a nonfilled counter), a signal is provided by the "OR" gate 55; and if active element A of every counter flip-flop 45A to 45E is nonoperative (indicative of a filled counter), a signal is not provided by the "OR" gate 55. An inverter 56 is connected in series with the "OR" gate output and operates, only when no output is provided by the "OR" gate 55, to transmit a signal over line 18 of the coincidence circuit 10 to the inhibit gate 17. In response to the signal from the inverter 56, the inhibit gate 17 prevents transmission of input signals, to be added, through the inhibit gate 17 to the storage flip-flop 16.

Thus it may be seen that a coincidence circuit has been provided for controlling the transmission of input pulses to a counter so that simultaneously received input pulses are sequentially transmitted to the counter. Additionally, it may be seen that a coincidence circuit has been provided which converts an electronic binary counter into a differential counter capable of adding and subtracting pulses transmitted thereto.

While one specific embodiment of the invention has been described in detail, it will be obvious that various modifications may be made from the specific details described without departing from the spirit and scope of the invention.

What is claimed is:

1. A coincidence circuit for a reversible counter capable of adding and substracting input pulses applied thereto, which comprises:

(a) a pair of input conductors over which input pulses are transmitted, one conductor being provided for input pulses to be added and the other conductor being provided for input pulses to be subtracted;
(b) a pair of storage devices, each storage device being associated with one of the input conductors so that input pulses are independently stored therein;
(c) continuously operable means for alternately reading out pulses stored in the storage devices;
(d) means responsive to a pulse read out from the storage device in which pulses to be added are stored for conditioning the counter for an adding operation and also responsive to a pulse read out from the storage device in which pulses to be subtracted are stored for conditioning the counter for a subtracting operation; and
(e) means for reducing the time period of the pulses read out from the storage devices and for causing the reduced pulses to be applied to the counter a predetermined time period after the counter has been conditioned for the receipt thereof, input pulses received at substantially the same time being serially transmitted to the counter with a distinct transition provided therebetween.

2. The circuit as recited in claim 1 wherein means are provided for negating the effect of a continuously operable read out means on a storage device while an input pulse is being stored therein.

3. A coincidence circuit for a reversible counter capable of adding and subtracting pulses applied thereto which comprises:

(a) a pair of input conductors over which input pulses are transmitted, one conductor being provided for pulses to be added and the other conductor being provided for pulses to be subtracted;
(b) a pair of bistable storage devices, each bistable storage device being associated with one of the input conductors and being driven from a primary stable state to a secondary stable state in response to the transmission of an input pulse over the associated input conductor;
(c) a pair of control signal conductors, each control signal conductor being so associated with one of the bistable storage devices that an output signal representative of a previously received input pulse is impressed therein when the associated bistable storage device is driven from the secondary stable state to the primary stable state;

(d) first continuously operable means for alternately applying pulses to the bistable storage devices that drive each bistable storage device that has attained the secondary stable state back to the primary stable state;

(e) means responsive to an output signal produced in one of the control signal conductors for conditioning the counter for an adding operation and responsive to an output signal produced in the other control signal conductor for conditioning the counter for a subtracting operation;

(f) a pair of bistable control devices, each bistable control device being associated with one of the control signal conductors and being driven from a primary stable state to a secondary stable state in response to an output signal being impressed in the associated control signal conductor;

(g) second continuously operable means for alternately applying pulses to the bistable control devices that drive each bistable control device that has attained the secondary stable state back to the primary stable state, the pulses being provided at twice the frequency at which pulses are provided by the first continuously operable means;

(h) a counter input conductor so associated with the bistable control devices that a counter input pulse is induced therein when a bistable control device is driven from the primary stable state to the secondary stable state and back to the primary stable state, counter input pulses representative of input pulses received at substantially the same time being serially transmitted to the counter with a distinct transition provided therebetween; and (i) means for delaying the transmission of each counter input pulse to the counter until the counter has been conditioned for the receipt thereof.

4. The circuit as recited in claim 3 wherein the bistable storage devices and the bistable control devices are flip-flops.

5. The circuit as recited in claim 3 wherein means are provided for preventing the feeding of pulses to be subtracted to the storage device when the counter is at a zero setting and for preventing the feeding of pulses to be added to the storage device when the counter is at a maximum setting.

References Cited by the Examiner

UNITED STATES PATENTS

| | | | |
|---|---|---|---|
| 3,028,084 | 3/1962 | Weatherill | 235—92 |
| 3,108,226 | 10/1963 | Douglas | 235—92 |

OTHER REFERENCES

Pages 2074, 2075, December 1960, "Bidirectional Counting" by Hupp, from "Instruments & Control Systems," vol. 33.

MALCOLM A. MORRISON, *Primary Examiner.*

J. F. MILLER, *Assistant Examiner.*